United States Patent [19]

Pasieka

[11] Patent Number: 4,755,839

[45] Date of Patent: Jul. 5, 1988

[54] PIVOTALLY MOUNTED SPREAD ROLLER ASSEMBLY

[75] Inventor: John F. Pasieka, Acton, Mass.

[73] Assignee: Polaroid Corporation, Cambridge, Mass.

[21] Appl. No.: 63,497

[22] Filed: Jun. 18, 1987

[51] Int. Cl.[4] ............................................. G03B 17/52
[52] U.S. Cl. .................................... 354/86; 354/173.1; 354/212
[58] Field of Search .................... 354/83–87, 354/173.1, 212

[56] References Cited

U.S. PATENT DOCUMENTS 2,483,390 10/1949 Gannon .
3,165,039 1/1965 Downey .
3,426,664 2/1969 Norton .
3,537,370 11/1970 Wareham .
3,722,383 3/1973 Van Allen et al. .
4,090,211 5/1978 Oishi et al. ............................ 354/86
4,664,497 5/1987 Johnson et al. ....................... 354/86
4,688,912 8/1987 Johnson et al. ....................... 354/86

Primary Examiner—L. T. Hix
Assistant Examiner—David M. Gray
Attorney, Agent, or Firm—Alfred E. Corrigan

[57] ABSTRACT

Photographic apparatus for moving an exposed film unit of the instant type from a film cassette and through an arcuate passageway which changes its path of movement from a first direction to a second direction, the apparatus including a roller assembly having a first orientation which moves the exposed film unit into the arcuate passageway and a second orientation in which it withdraws it from the same and moves it toward a storage chamber. The roller assembly also functions to spread a processing liquid across a layer of the exposed film unit to initiate the formation of a visible image therein.

14 Claims, 4 Drawing Sheets

PIVOTALLY MOUNTED SPREAD ROLLER ASSEMBLY

BACKGROUND OF THE INVENTION

1. Field of the Invention

The invention relates to photographic apparatus, e.g., a camera having a spread roller assembly for spreading a photographic processing composition across a layer of an exposed film unit of the instant type so as to initiate the formation of a visible image.

2. Description of the Prior Art

The present invention relates to compact photographic apparatus for use with film units of the instant or self-developing type, and more particularly to such an apparatus having a spread roller assembly for assisting in the movement of an exposed film unit from an exposure position to a storage chamber. The spread roller assembly is adapted to move the film unit through a minimum path of travel while simultaneously spreading a photographic processing composition, preferably liquid, across a layer of the exposed film unit in order to initiate the formation of a visible image within the film unit.

Generally speaking, the concept of providing a compact photographic apparatus by minimizing the length of the path of travel of the exposed film unit between its exposure position and its storage position may be accomplished by locating the latter substantially adjacent to the former and moving the exposed film unit in a first direction away from the exposure position and then in a second generally opposite direction toward the storage position. During such movement a processing liquid is spread across a layer of the film unit to initiate the formation of a visible image within the film unit. Examples of cameras utilizing such concept may be found in U.S. Pat. Nos. 3,426,664, 3,537,370 and 3,722,383.

As regard the camera described in the '664 patent, a rather complicated and expensive belt system is required to move the film unit from its cassette into and through its exposure position and then into its storage position while simultaneously synchronizing the camera's exposure system with such movement. The compactness of the camera shown in the '370 patent is compromised, at least in its long dimension, due to the requirement of a flat compartment for receiving a portion of an exposed film unit prior to its movement back toward a storage position. Finally, the camera shown in the '383 patent requires movement of an image-receiving sheet into superposition with an exposed image-recording sheet, movement of the two between a pair of spread rollers, and then stripping of the image-recording sheet from the image-receiving sheet.

SUMMARY OF THE INVENTION

The present invention relates to photographic apparatus for use with instant type film units, and more particularly to such an apparatus having a spread roller assembly the rollers of which are adapted for movement between first and second orientations as an exposed film unit is moved completely out of its exposure position and toward a storage position. More specifically, the present invention relates to a self-developing or instant type photographic apparatus, e.g., a camera, having a lighttight imbibition or storage chamber in which an exposed film unit may remain until its latent image has been substantially transformed into a viewable image. The apparatus includes a housing enclosing a film chamber having structure for locating and supporting a film cassette containing a stack of film units in position for the sequential exposure of the film units. Located rearwardly or below the film cassette supporting structure and closely adjacent thereto is the storage chamber which is adapted to receive an exposed film unit, subsequent to a processing liquid being spread across a layer thereof, and maintain it in a lighttight environment until the processing liquid has sufficiently imbibed the film unit to cause the formation of a visible image. The apparatus includes a battery operated motor mounted adjacent one end of the film cassette supporting structure and means for advancing an exposed film unit from the film cassette and into the lighttight imbibition or storage chamber. The aforementioned means includes a first means in the form of a cantilevered member having a free end which is adapted to move an uppermost exposed film unit from the film cassette; second means including a pair of elongate rollers which are adapted to engage the exposed film unit and continue its movement away from the film cassette and into an arcuate passageway where it is bent and directed toward the imbibition chamber; and a second cantilevered member for subsequent advancement of the exposed film unit fully into the imbibition chamber. The rollers are adapted to rupture a container of processing liquid carried on a leading end of the advancing exposed film unit and spread its contents between layers thereof to initiate the formation of a visible image therein by a diffusion transfer process. As the exposed film unit leaves the bite of the rollers, its trailing end is located in a position to be engaged by the second cantilevered member for subsequent movement into the imbibition chamber.

The apparatus also includes means for mounting the second means for movement from a first orientation, wherein the elongate rollers continue the advancement of the exposed film unit in a first directon away from the film cassette and toward the arcuate passageway to a second orientation, wherein the rollers advance the exposed film unit in a second directon toward the lighttight imbibition or storage chamber. In a preferred embodiment of the invention the rollers are mounted for rotation about their individual axis as well as being mounted for movement as a unit about an axis spaced from the axes of the rollers. In an alternative embodiment, one of the rollers is rotatable about its own axis as well as that of the other roller.

The apparatus further includes a loading door through which a film assemblage may be located on the aformentioned supporting structure. The loading door, which comprises one of the walls of the imbibition chamber, has a window therein through which the visible image in a film unit located within the imbibition chamber may be viewed without opening the loading door. Such window is ordinarily rendered lighttight by a blind which is movable from its operative position covering the window, to an inoperative positon wherein the film unit within the chamber may be viewed. The blind is maintained in the operative position by a latch until the formation of a visibile image within the last exposed unit to enter the imbibition chamber has been substantially formed, or until the image is no longer subject to being adversely affected by the ambient light. After the image has been developed to the state whereat it is no longer susceptible to being adversely affected by the outside light, a timing circuit energizes a solenoid to move the latch to a positon wherein the blind may be moved to its inoperative position.

The imbibition or storage chamber is also provided with a light sealed opening through which all of the film units located within the imbibition chamber may be moved as a unit to the exterior of the photographic apparatus. Suitable means, such as manually actuatable slide, may be provided for such purpose.

An object of the invention is to provide photographic apparatus for use with instant type film units with means movable from a first orientation for moving an exposed film unit in a first direction, away from a film cassette, to a second orientation in which the film unit is moved in a generally opposite second direction toward a storage chamber, the exposed film unit having a processing liquid spread across one of its layers during such movement between the film cassette and the storage chamber.

Another object of the invention is to provide photographic apparatus of the type described with an arcuate passageway for cooperating with the above described movable means for shortening the path of travel of an exposed film unit as it moves from a film cassette to a storage chamber located substantially immediately below the film cassette's supporting structure.

Still another object of the invention is to provide photographic apparatus of the type described with a roller assembly movable from a first orientation in which it moves an exposed film unit in a first direction and then assumes a second orientation in which it moves the film unit in a second direction, the roller assembly also functioning to spread a processing liquid across a layer of the exposed film unit during its movement in one of the two directions.

Other objects of the invention will in part be obvious and will in part appear hereinafter.

The invention comprises the apparatus possessing the construction, combination of elements and arragnement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 5:
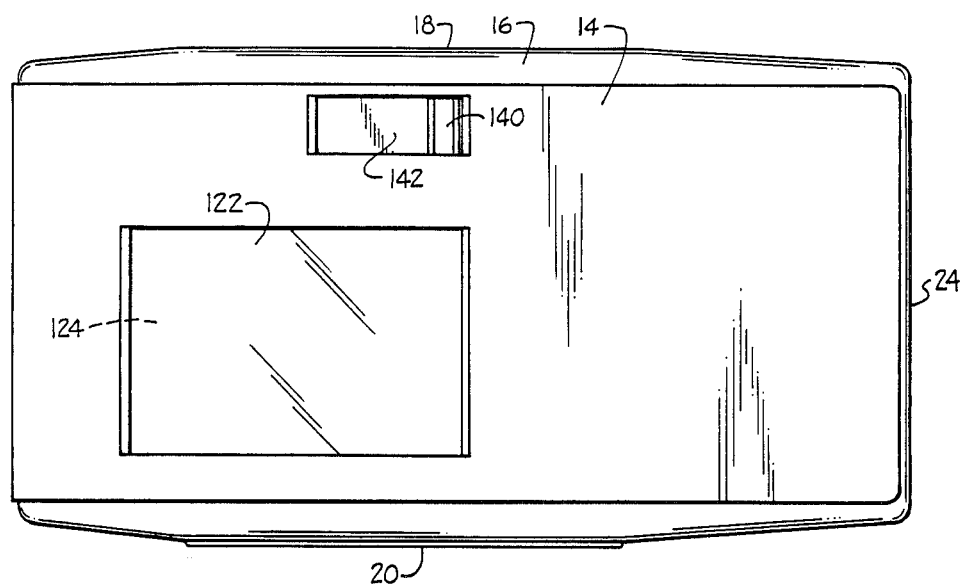
FIG. 5 is a bottom view of the camera.

Reference is now made to the drawings wherein is shown photographic apparatus in the form of a folding camera 10 of the instant or self-developing type. The camera 10 includes a first or main housing 12 having a loading door 14 (See FIG. 5) in a bottom wall 16 thereof. The first housing 12 also includes front and rear walls 18 and 20, respectively, and end walls 22 and 24. The door 14 is pivotally connected to the end wall 22 of the main housing 12 by a hinge (not shown) which is generally parallel with the axis of the camera's objective lens 28 and perpendicular to the forward and rear walls 18 and 20. The main housing 12 further includes a top wall 30 having a pair of spaced flanges 32 and 34 extending upwardly therefrom so as to define a recess 36.

Figure 1:
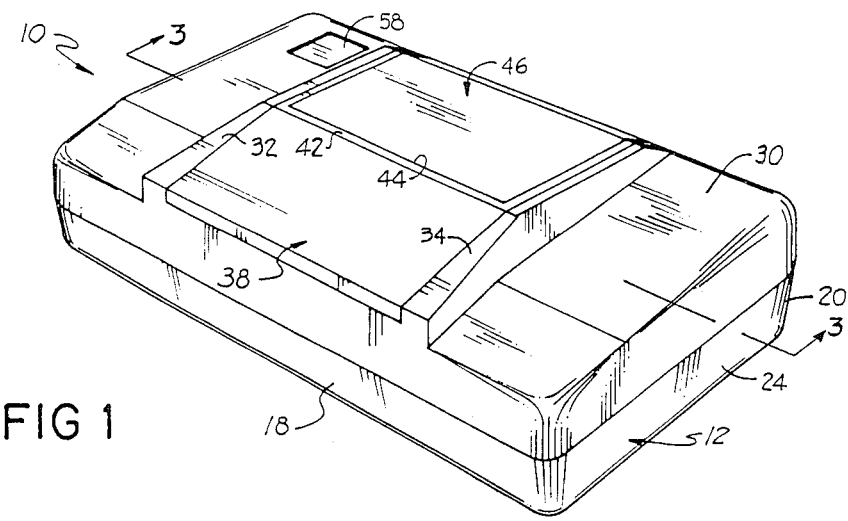
FIG. 1 is a perspective view of a folding type instant camera which incorporates a preferred embodiment of the present invention, the camera being shown in a folded condition.
Figure 2:
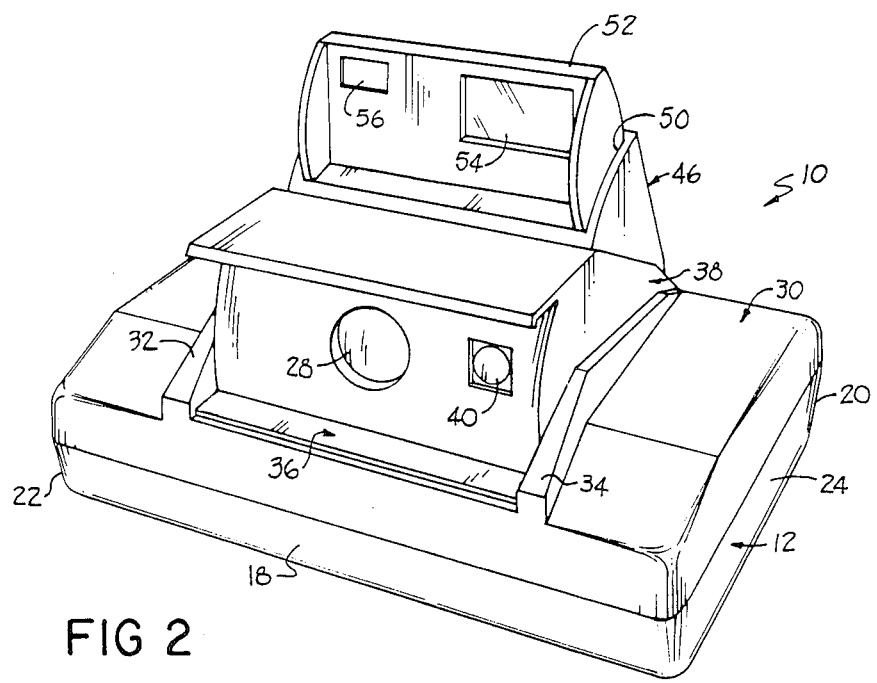
FIG. 2 is a perspective view showing the camera of FIG. 1 in an extended operative condition.

The camera 10 further includes a second housing 38 which is pivotally coupled to the first housing 12 about an axis (not shown) which is generally parallel with the rear wall 20 for movement between an inoperative position (see FIG. 1), wherein it is nested within the recess 36, and its operative positon, as shown in FIG. 2. The second housing 38 supports the aforementioned objective lens 28, a shutter assembly, and a photocell window 40. A top wall 42 of the second housing 38 includes a recess 44 which is adapted to receive a third housing 46 of the camera 10 when the camera is being collapsed or folded.

The third housing 46 is pivotally coupled to the rear wall 20 of the first housing 12 about a horizontal axis (not shown) which is generally parallel with the rear wall 20. The third housing 46 is provided with a recess 50 for pivotally receiving therein a fourth housing 52.

The fourth housing 52 supports a source of artificial illumination such as a strobe 54 and an associated I.R. rangefinder window 56 for providing an input to the strobe's electrical circuit. The fourth housing 52, as well as the second and third housings 28 and 46, is biased into the erect position shown in FIG. 2. Further, the fourth housing 52 is adapted to be nested within the recess 50 prior to the third housing 46 being moved into the recess 44.

When the various housings are in the positions shown in FIG. 2, actuation of an exposure cycle initiation button 58 (see FIG. 1) located within a recess in the top wall 30 of the first housing 12 is effective to cause image bearing light rays to enter the camera 10 via the lens 28 and be reflected downwardly by a mirror (not shown) onto a film unit 62. For more specific details of the viewing and exposing system of the camera 10, reference may be had to the copending application Ser. No. 028,457, filed on March 20, 1987 by G. D. Whiteside et al and assigned in common herewith.

The camera 10 is adapted to receive a film assemblage of the type which includes a film cassette 60 having therein a stack of the film units 62 which is resiliently biased by a spring 64 toward a forward wall 66 of the cassette 60 so as to locate the uppermost film unit 62 adjacent to an exposure aperture 68 in the wall 66. The film units 62 are of the integral self-developing or instant type and include a rupturable pod 70 of processing liquid at their leading end and a trap 72 at their trailing end for receiving any excess processing liquid, as is well known in the art. The camera 10 includes a plate 74 for supporting the film cassette 60 in position for the sequential photographic exposure of the film units 62. The plate 74 includes an upwardly curved end section 76 for engaging a leading end wall 78 of the film cassette 60 and an upwardly standing flange 80 for engaging a trailing end wall 82 of the film cassette 60, thereby properly locating the film cassette 60 relative to the reflected optical axis of the objective lens 28.

Figure 3:
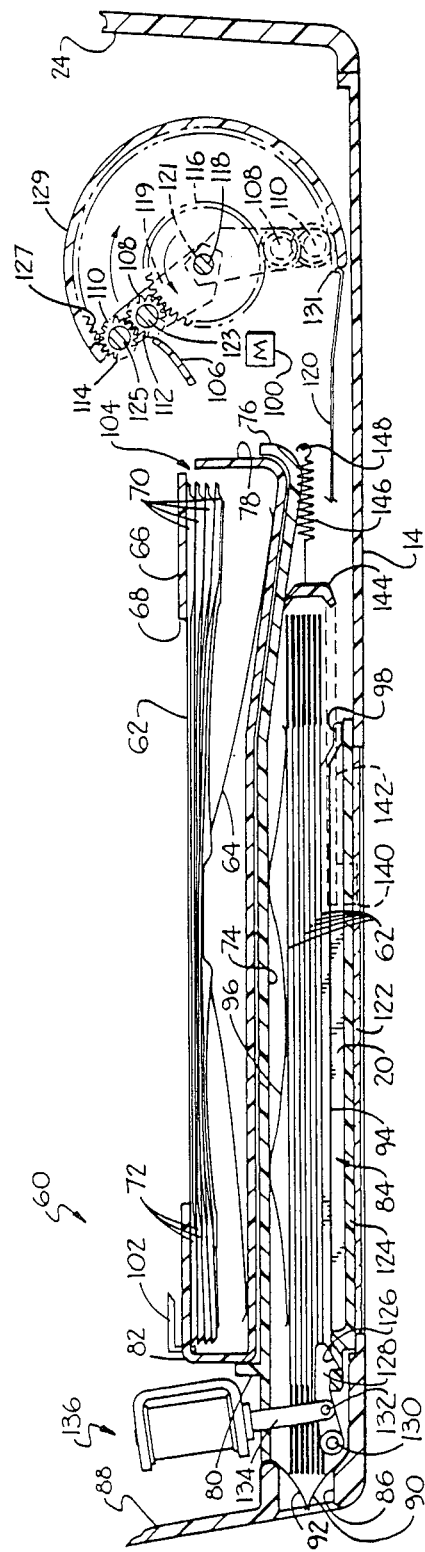
FIG. 3 is an enlarged cross sectional view, partly in section, of the camera, taken generally along the line 3—3 of FIG. 1, the upper portion of the camera being omitted for reasons of clairty.

The camera 10 also includes a lighttight imbibition chamber 84 which is defined in part by the loading door 14, the support plate 74 and the forward and rear walls 18 and 20 of the first housing 12. The imbibition chamber 84 provides a lighttight environment in which exposed film units 62 may be located during the period that the aforementioned processing liquid is being imbibed by one or more layers of the film unit 62. Exit of the film units 62 from the imbibition chamber 84 may be had by way of an egress opening 86 formed in an upturned end 88 of the loading door 14, such opening being rendered lighttight by a pair of resilient, opaque, cantilevered members 90 and 92. A flange 94 (only one shown) extends inwardly for a short distance from each of the walls 18 and 20 of the imbibition chamber 84 for supporting the lateral sides the exposed film units 62, as shown in FIG. 3. A spring 96 is mounted on the supporting wall 74 for frictionally maintaining the exposed film units in place. Each of the flanges 94 is provided with a downwardly turned portion 98 at one end thereof which functions as a ramp to guide the leading ends of the exposed fim units 62 up onto the flanges 94.

Subsequent to the exposure of a film unit 62, a battery operated motor 100 is energized to drive a first means in the form of a film advancing member 102 in a reciprocating manner to engage the exposed film unit by its trailing edge and advance the film unit in a first direction toward the exterior of the film cassette 60 via an exit opening 104. As the exposed film unit 62 emerges from the film cassette 60, its leading edge is deflected upwardly by a laterally extending guide plate 106 into the bite of a second means in the form of a pair of motor driven elongate rollers 108 and 110. The rollers 108 and 110 are drivingly interconnected at their ends by gears 112 and 114, respectively, with the gear 112 also being in mesh with a larger drive gear 116 which in turn is connected to the motor 100 by a transmission (not shown). The drive gear 116 is mounted for rotation about an end of a fixed shaft 118, the opposite ends of which are supported by means not shown. Also mounted for rotation about opposite ends the shaft 118 is a pair of arms 119 (only one being shown). Each of the arms 119 includes an aperture 121 at one end, for rotatable receiving one of the opposite ends of the shaft 118, and a pair of apertures at its opposite end for receiving the journals 123 and 125 of the rollers 108 and 110, respectively. Thus rotation of the drive gear 116 in a counterclockwise direction, as shown by the arrow in FIG. 3, is effective to rotate the rollers 108 and 110 in directions which will continue to advance the exposed film unit 62 in the first direcrton while simultaneously rupturing the processing liquid container 70 and spreading its contents between layers of the exposed film unit 62 so as to initiate the formation of a visible image within the film unit 62.

The rollers 108 and 110 are mounted for movement from a first orientation, as shown in solid lines in FIG. 3, wherein they continue the advancement of the exposed film unit 62 in the first direction, to a second orientation, as shown in broken lines in FIG. 3, wherein they advance the exposed film unit 62 in a second direction, generally opposite to the first direction, toward the chamber 84. The means for mounting the rollers 108 and 110 for such movement include the aforementioned arms 119, as well as a gear rack 127 formed in one end of an arcuate guide member 129. The gear rack 127 has an axis coincident with that of the shaft 118 and is always in mesh with the gear 114 on the roller 110, suitable stops (not shown) being provided at the beginning and the end of the gear rack 127. The arcuate guide member 129 has a lateral dimension substantially equal to the length of the rollers 108 and 110 and is located in the path of travel of the exposed film unit as it is being advanced in the first direction. Thus, it can be seen that counterclockwise rotation of the roller 110 (as well as gear 114) about its longitudinal axis so as to advance the exposed film unit in the first direction will cause the gear 114 to "walk" or move along the gear rack 127 thereby carrying along with it the two arms 119. The gear 114 continues to "walk" along the gear rack 127 until the arms 119 and the rollers 108 and 110 enter the broken line position (second orientation) shown in FIG. 3. As the rollers 108 and 110 enter this latter position, the exposed film unit exits from between the rollers 108 and 110 and further clockwise rotation of the arms 119 is prevented by a suitable stop, as well as by shutting the motor 100 off. Alternatively, the gear 114 could be connected to the roller 110 by a clutch and be located in mesh with the gear rack 127 and out of mesh with the gear 112 thus enabling (1) the clockwise rotation of the arms 119 to be stopped in the broken line position, and (2) rotation of the gear 114 to be stopped while power is continued to the roller 108 until the film unit emerges from between the rollers 108 and 110. In this latter drive arrangement, the roller 110 and its gear 114 would be driven by the frictional force between the exposed film unit 62 and the roller 110 as the former moves between the rollers 108 and 110. Thus, as the rollers 108 and 110 move as a unit from the first orientation to the second orientation, the leading end of the exposed film unit 62 is moved into engagement with the arcuate guide member 129 which deflects it in a manner which assists in the change of direction of movement of the film unit from the first to the second direction while simultaneously providing for a shorter path of movement of the film unit 62 toward the imbibition chamber 84.

As the exposed film unit 62 emerges from between the rollers 108 and 110, it falls upon a portion 120 of a second reciprocatable member such that an upturned end 131 thereon is located just to the right of the film unit's trailing end. The direction of the motor's 100 drive is then reversed to return the rollers 108 and 110 and their respective arms 119 to the first orientation and the portion 120 is driven in a reciprocating manner thus causing the end 131 to engage the exposed film unit 62 by its trailing edge and continue its movement up onto the flanges 94 where it wil remain in a lighttight environment for a predetermined period of time until the processing liquid has been sufficiently imbibed by layers of the film unit. The predetermined period of time starts substantially at the time that the processing liquid is spread across the exposed film unit and ends when the emerging image within the exposed film unit 62 will no longer be substantially adversely affected by any ambient light which may enter the imbibition chamber 84 via a viewing window 122 located within the loading door 14. The viewing window 122 has dimensions which generally are the same as those of the image area in the exposed film unit 62.

The viewing window 122 is generally covered in lighttight relation by an opaque blind 124 thereby maintaining the lighttightness of the imbibition chamber 84. The blind 124 is provided with an aperture 126 at one end thereof for receiving a free end of a latch 128. The latch 128 is adapted to releasably maintain the blind 124 in its operative light blocking position against the bias of a spring (not shown) which in turn is adapted to move the blind 124 into its inoperative position wherein the image in the exposed film unit 62 may be viewed. The latch 128 is pivotally coupled at 130 to a fixed portion of the camera 10 and at 132 to an arm 134 of a solenoid 136. The solenoid 136 is temporarily energized at the end of the aforementioned predetermined period of time, e.g., thirty seconds, so as to pivot the latch 128 in a counterclockwise manner, as viewed in FIG. 3, thus releasing the blind 124 for automatic movement into its inoperative position. Alternatively, the blind 124 could be provided with a manually actuated member for moving the blind 124 into its inoperative position subsequent to the actuation of the latch 128.

After the image in the exposed film unit 62 has been viewed through the uncovered window 122, the operator of the camera 10 may either leave it in the imbibition chamber and continue to photograph subjects, or remove the exposed film unit 62 for closer inspection. To remove the exposed film unit 62 from the imbibition chamber 84, the operator merely moves a button 140 to the left, as viewed in FIG. 5. The bottom 140 is attached to a slide plate 142 having an inwardly turned film engaging end 144. As can be seen in FIG. 3, such movement of the film engaging end 144 is effective to move all of the film units (six being shown) from the imbibition chamber 84 via the opening 86 to a position whereat the operator may grasp them and complete their removal. A spring 146 having one end attached to the film engaging end 144 and its opposite end attached to a pin 148 extending inwardly from a wall of the imbibition chamber 84 is provided for returning the film engaging end 144 to the position shown in FIG. 3. If the operator desires to leave the exposed film units 62 within the imbibition chamber and continue photographing subjects, actuation of the exposure cycle initiation button 58 not only actuates the shutter, but also completes a circuit to the motor 100. The motor 100 in turn drives the various elements described above for advancing the newly exposed film unit 62 from the cassette 60 to the bottom of the stack of film units 62 already in the imbibition chamber 84. The motor 100 also drives suitable means such as a cam (not shown) which drives the blind 124 back into latched relation with the latch 128 thereby rendering the imbibition chamber 84 lighttight.

After all of the film units 62 have been exposed and removed from the imbibition chamber 84, the empty film cassette 60 may be removed by unlatching and pivoting the loading door 14 in a clockwise manner about its hinge (not shown). As the loading door 14 is pivoted toward its open position, it carries therewith among other elements, the support plate 74 carrying the film cassette 60, the second reciprocating means 120, the blind 124, the solenoid 136 and the slide plate 142, end 144, spring 146 and pin 148, thereby providing easy access to structure such as the rollers 108 and 110.

Figure 4:
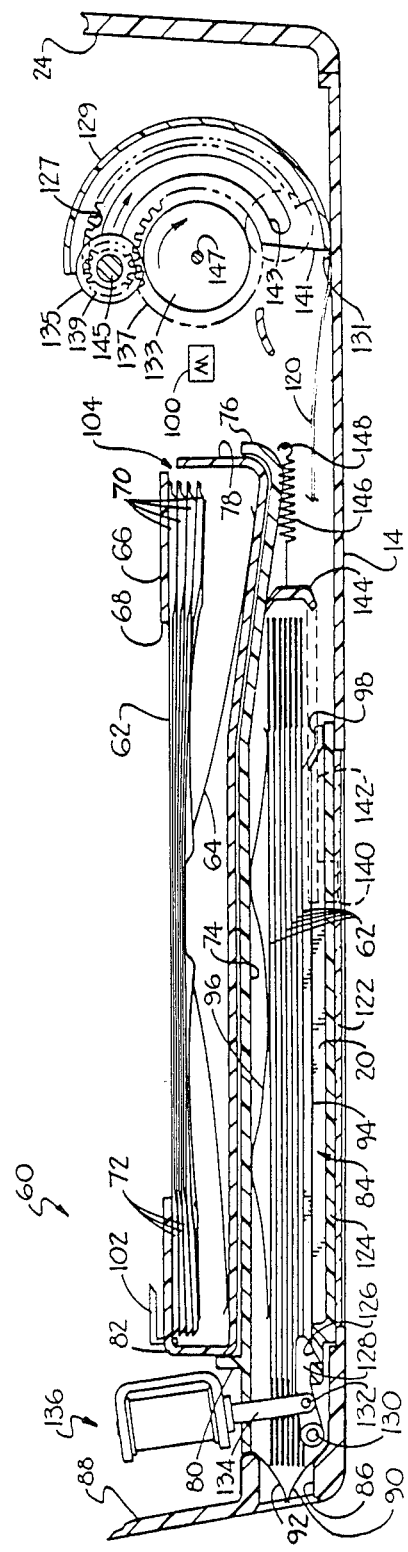
FIG. 4 is an enlarged cross-sectional view, similar to FIG. 3 showing the camera with an alternative embodiment of a spread roller assembly.

Reference is now made to FIG. 4 of the drawings wherein is shown an alternative embodiment of the invention. In this embodiment, the second means for continuing the movement of an exposed film unit 62 in the first direction comprises a pair of elongate spread rollers 133 and 135 which are rotatably connected to each other by gears 137 and 139 mounted on the ends of the rollers. The gear 137 is suitably connected to the output of the motor 100 by means not shown, and the gear 139 is located in mesh with the arcuate gear rack 127 on the guide member 129. Also, the guide member 129 is provided with an inwardly directed flange 141 at each end thereof (only one being shown), each flange having an arcuate slot 143 therein. The slots 143 are adapted to receive the journals 145 of the spread roller 139 so as to assist the latter in its movement about the axis 147 of the spread roller 133.

Subsequent to the photographic exposure of the uppermost film unit 62 in the film cassette 60, the motor 100 is energized so as to cause the film engaging member 102 to move in a first direction, to the right, thus moving the exposed film unit 62 in the first direction through the slot 104 and into engagement with the rotating roller 133. The transmission (not shown) between the motor 100 and the roller 133 may include a clutch which is engaged at the time the leading end of the exposed film unit engages it so as to start its rotation. The film unit 62 is then deflected upwardly by the surface of the roller 133 into the pressure generating bite between it and the other roller 135. The rollers 133 and 135 rupture the container 70 of processing liquid and spread its contents between layers of the film unit 62 so as to initiate the formation of a visible image therein while continuing to advance the exposed film unit 62 away from the film cassette. Simultaneously therewith, rotation of the roller 133 and its gear 137 in a clockwise direction is effective to cause the gear 139 to rotate the roller 135, as well as to "walk" along the fixed arcuate gear rack 127. Thus, the gear 139 rotates about the axis of roller 135, as well as the axis 147 of the roller 133 as the rollers 133 and 135 move from a first orientation, as shown in solid lines in FIG. 4, to a second orientation wherein the roller 135 is located in the broken line positon. During such movement, the inner surface of the arcuate guide member 129 aids in deflecting the leading end of the exposed film unit 62 into a second direction, generally opposite to said first direction. As in the embodiment described with reference to FIG. 3, when the exposed film unit emerges from between the rollers 133 and 135 when the latter are in the second orientation, the reciprocable member 120 is energized to move the exposed film unit 62 into the chamber 84 and the direction of rotation of the gear 137 is reversed thus returning the roller 135 to its first orientation where it is located on the opposite side of the roller 133, vis-a-vis, the position it occupied in the second orientation.

Since certain changes may be made in the above described apparatus without departing from the scope of the invention herein involved, it is intended that all matter contained in the above description or shown in the accompanying drawings shall be interpreted as illustrative and not in a limiting sense. For example, while the present invention has been shown in a camera of the folding type, it is equally as applicable to non-folding cameras. Still further, the storage chamber for the film units need not be lighttight if the film units are provided with their own system for preventing further exposure, such as a chemical opacifer.

What is claimed is:

1. Photographic apparatus for use with film units of the instant type comprising:

means for supporting a film cassette containing a plurality of individual film units of the instant type in position for their sequential exposure;

means for defining a chamber into which a film unit is adapted to be advanced subsequent to its exposure, said chamber being located substantially adjacent to and in underlying relation with said supporting means;

first means for advancing a film unit in a first direction subsequent to its exposure, at least partially from the film cassette;

second means including a pair of elongate rollers having adjacent surfaces defining a pressure generating gap through which the exposed film unit is adapted to be advanced, said elongate rollers being constructed to spread a processing liquid across a layer of the exposed film unit to initiate the formation of a visible image within the exposed film unit while simultaneously advancing the exposed film unit therebetween;

means for rotating at least one of said elongate rollers about its longitudinal axis; and means for mounting said second means for movement from a first orientation, wherein they continue the advancement of the exposed film unit in said first direction, to a second orientation, wherein they advance the exposed film unit in a second direction, generally opposite to said first direction, toward said chamber.

2. Photographic apparatus as defined in claim 1 wherein said mounting means include means for supporting the other of said elongate rollers for rotation about first and second axis as said second means moves from said first orientation to said second orientation.

3. Photographic apparatus as defined in claim 2 wherein said other elongate roller includes a gear mounted on at least one end thereof, and said mounting means includes a gear rack engageable by said gear for assisting said other elongate roller in its movement from said first orientation to said second orientation.

4. Photographic apparatus as defined in claim 1 wherein said mounting means is adapted to support both of said elongate rollers for simultaneous movement between said first and second orientations.

5. Photographic apparatus as defined in claim 4 wherein said mounting means includes means cooperable with the other of said elongate rollers for assisting said elongate rollers in movement between said first and second orientations.

6. Photographic apparatus as defined in claim 5 including means engageable by a leading edge of a film unit as it is emerging from between said elongate rollers for assisting in the change of direction of movement of the film unit from said first direction to said second direction.

7. Photographic apparatus as defined in claim 5 wherein said cooperable means includes an arcuate gear rack having an axis and said other elongate roller includes a gear on one end thereof located in engagement with said arcuate gear rack, whereby rotation of said gear is effective to move said elongate rollers as a unit about said axis of said arcuate gear rack.

8. Photograhic apparatus as defined in claim 2 wherein said first axis is the axis of rotation of said other elongate roller and said second axis the the axis of rotation of said one elongate roller.

9. Photographic apparatus as defined in claim 8 further including a gear mounted on at least one end of said other elongate roller, and said mounting means includes a gear rack engageable by said gear for assisting said other elongate roller in its movement between said first and second orientations.

10. Photographic apparatus as defined in claim 9 wherein said gear rack is arcuate.

11. Photographic apparatus as defined in claim 10 wherein said arcuate gear rack has a radius of curvature which is symmetrical with respect to said second axis.

12. Photographic apparatus as defined in claim 11 wherein said mounting means includes a flange having an arcuate slot therein for supporting an end of said other elongate roller.

13. Photographic apparatus as defined in claim 10 further including means engageable by a leading edge of a film unit as it is emerging from between said pair of elongate rollers for assisting in the change of direction of movement of the film unit from said first direction to said second direction.

14. Photographic apparatus as defined in claim 1 wherein said one elongate roller is located on one side of the other of said elongate rollers when they are in said first orientation, and said on elongate roller is located on substantially the opposite side of said other elongate roller when they are in said second orientation.

* * * * *